United States Patent [19]
Vrignaud

[11] Patent Number: 6,108,852
[45] Date of Patent: Aug. 29, 2000

[54] ORAL HYGIENE DEVICES AND MANUFACTURING METHODS THEREFOR

[75] Inventor: Jean Louis Vrignaud, Scottsdale, Ariz.

[73] Assignee: Remedent USA, Inc., Escondido, Calif.

[21] Appl. No.: 09/192,688

[22] Filed: Nov. 16, 1998

Related U.S. Application Data

[62] Division of application No. 08/908,839, Aug. 8, 1997, Pat. No. 5,934,762.

[51] Int. Cl.$^7$ ....................................................... A46B 9/04
[52] U.S. Cl. ........................... 15/167.2; 15/143.1; 15/106
[58] Field of Search ................................ 15/143.1, 167.1, 15/106, 167.2

[56] References Cited

U.S. PATENT DOCUMENTS

| | | |
|---|---|---|
| 1,679,946 | 8/1928 | Ruff . |
| 1,830,995 | 11/1931 | Genn . |
| 1,908,509 | 5/1933 | Davis . |
| 2,807,820 | 10/1957 | Dinhofer . |
| 3,953,907 | 5/1976 | Froidevaux . |
| 4,498,209 | 2/1985 | Weiss . |
| 5,054,154 | 10/1991 | Schiffer . |
| 5,305,491 | 4/1994 | Hegemann . |
| 5,316,027 | 5/1994 | Klinkhammer . |
| 5,383,244 | 1/1995 | Ahrens . |
| 5,398,369 | 3/1995 | Heinzelman . |
| 5,758,383 | 6/1998 | Hohlbein ................................ 15/167.1 |

FOREIGN PATENT DOCUMENTS

| | | |
|---|---|---|
| 0611533 | 8/1994 | European Pat. Off. . |
| 2192784 | 1/1988 | United Kingdom . |

*Primary Examiner*—Randall E. Chin
*Attorney, Agent, or Firm*—Richard R. Mybeck

[57] ABSTRACT

A comprehensive oral hygiene device preferably having a multi-headed oral care brush disposed at one end of an elongated handle and a manufacturing process therefor. The oral care brush of the present invention has at least one head and preferably two heads which are disposed in angular, generally opposing coactive relationship to each other. Each of the opposing heads is integrally formed on an independently manufactured flexible arm and each arm is subsequently attached to the elongated handle. The attachment of the arms to the handle involves a secondary process called overmolding. Overmolding in this case involves the placement of the arms in a secondary mold in operative position against the end of the handle. Then, a soft, preferably rubber-like material is injected into the secondary mold and surrounds elongated portions of the arms and the handle. When cured and removed from the secondary mold, the rubber-like material secures the arms in operative position against the handle. The flexibility of the brush arms may be enhanced by the rubber-like material which allows some outward flexure of the arms. A preferred two-headed brush arrangement in which the two heads are disposed in opposing relationship to each other then provides for unobstructed movement of the brush heads down onto the gum tissue. A third head or other number of heads may also be incorporated hereon. A toothbrush may also be disposed on the opposite end of the handle. The overmolding of the brush arms with the elongated handle preferably provides a distension on the handle and improves grip. It also reduces debris collection areas and thereby avoid bacterial growth and odor.

8 Claims, 2 Drawing Sheets

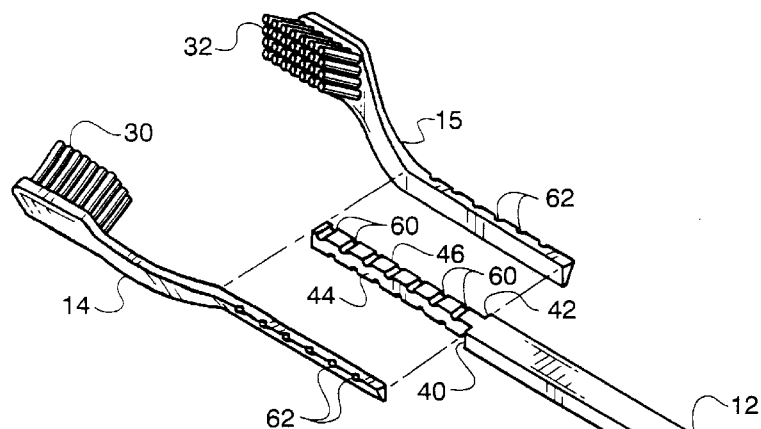
FIG. 2.
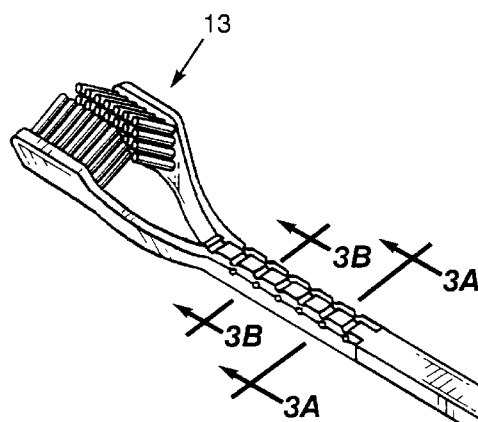
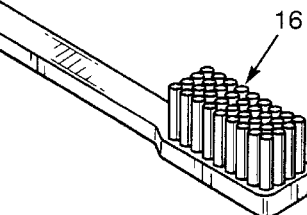
FIG. 3A.
FIG. 3.
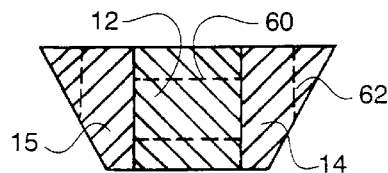
FIG. 3B.

ORAL HYGIENE DEVICES AND MANUFACTURING METHODS THEREFOR

This application is a divisional of U.S. patent application Ser. No. 08/908,839 filed Aug. 8, 1997, for Oral Hygiene Devices and Manufacturing Methods Therefor, now U.S. Pat. No. 5,934,762.

INTRODUCTION

The present invention is directed generally to oral hygiene devices and manufacturing methods therefor and more particularly to a unique process for making such devices which preferably have a handle and a multi-headed brush overmolded onto one end of the handle. The preferred devices also have a toothbrush on the other end of the handle.

BACKGROUND OF THE INVENTION

The art of oral hygiene devices is replete with multi-headed brush elements. For example, the concepts of dual and/or triple brush heads disposed on the same end of a handle and in which at least two such brush heads are disposed in generally opposing relationship to each other are shown, inter alia in Ruff (U.S. Pat. No. 1,679,946), Genn (U.S. Pat. No. 1,830,995), Davis (U.S. Pat. No. 1,908,509), Dinhofer (U.S. Pat. No. 2,807,820), Froidevaux (U.S. Pat. No. 3,953,907), Weiss (U.S. Pat. No. 4,498,209), Hegemann (U.S. Pat No. 5,305,491), Klinkhammer (U.S. Pat. No. 5,316,027), and Mak (UK Patent Application GB 2192784 A).

The prior devices have been manufactured in a plurality of manners. For example, some prior devices have integrally formed opposing arms and brush heads. Davis and Froidevaux disclose such devices. At least one manufacturing difficulty occurs with integrally formed opposing arms and heads in that it is not a simple task to implant the bristles on the opposing heads and thereafter also trim the bristles to the proper shape and height.

As an alternative to integral formation, Ruff teaches two separate spring handles which are uniquely pivoted together through use of an elliptical member on one handle inserted in a corresponding elliptical slot defined in the other handle, the handles then being pivoted relative to each other to hold the handles and brush heads in opposed relationship.

In another alternative, Genn teaches the production of a device in which two U-shaped springs are molded and imbedded in the opposing brush heads and are fastened to the toothbrush handle by means of cement or riveting.

Dinhofer teaches an initially flat, highly flexible main body in which at least two sets of bristles are imbedded. Then, the main body is bent and attached to the handle so that the two sets of bristles are ultimately disposed in opposing relationship.

In Froidevaux, the primary embodiment involves the separate manufacture of two handle portions which are ultimately connected together by an elongated dovetail joint. Each handle portion has a separate head so that when fully assembled, the resulting toothbrush has two opposing heads.

Weiss also involves the preliminary manufacture of separate handle members each having a brush head at one end thereof. These handle members are then joined at the non-brush head ends by a flexible pivot means such as a metal wire or flexible plastic.

Hegemann teaches the manufacture of a triple headed brush in which the three brush heads are independently attached to a single handle preferably using a snap fit of interlocking mechanical members. Other methods of connecting the three brush heads are also taught including using adhesive bonding, press pins, clamps, and/or sleeves, inter alia.

In Klinkhammer, two opposing arms are first integrally formed with and on one end of a handle. Then, two bristled tooth brushing members are subsequently attached one each to each of the respective ends of the opposing arms. The brushes are preferably molded around the pre-formed ends of the opposing arms using a different molding material for the different properties needed for the brushes.

Mak teaches a toothbrush with separately manufactured arms. These arms are subsequently inserted into a socket or sockets at one end of the handle and held in place by a variety of disclosed methods, preferably including a deflectable detent member such as a deflectable finger or a spring loaded ball. The arms are, however, preferably moveable such that they are rotatable relative to the handle. Thus, the brush heads may be moved to an opposing relationship relative to each other as well as to a position in which the two heads face in generally the same direction.

In view of the foregoing, it is readily apparent that there are many methods for manufacturing oral care devices having multiple heads at one end of a handle. However, many difficulties remain. For example, as related in Hegemann it is difficult to use conventional, or even special machinery to implant, trim and polish bristles in generally opposing brush heads. Moreover, the numerous highly complicated arm and handle connections are also not easily achievable using conventional machinery. Further, the use of mechanical bands and/or adhesives allows for spatial pockets to remain between component parts which provide areas for bacteria to live and grow. The use of adhesives is also not reliable against breakage, and adhesives further require intensive labor during assembly. It is toward the elimination of these and other manufacturing difficulties that the present invention is directed.

BRIEF SUMMARY OF THE INVENTION

The present invention primarily involves a manufacturing process for a comprehensive oral hygiene device having a multi-headed brush disposed at one end of an elongated handle and, when desired, a toothbrush at the other end of the handle. The multi-headed brush of the present invention preferably has two heads which are disposed in angular, generally opposing relationship to each other. Each of the two heads is integrally formed on a separately manufactured flexible arm and the bristles are then embedded in each head. Each arm is subsequently directly attached to the elongated handle. The attachment of the arms to the handle involves a secondary process called overmolding. Overmolding in this case involves the placement of the arms in a secondary mold in position against the end of the handle. Then, a soft, preferably rubber-like material is injected into the secondary mold so that it surrounds elongated end portions of the arms and the handle. When cured and removed from the secondary mold, the rubber-like material secures or holds the arms in operative position on the handle. The flexibility of the brush arms may be enhanced by the rubber-like material which allows some outward flexure of the arms. The preferred two-headed brush arrangement with generally opposing heads then provides a gumbrush having unobstructed movability of the brush heads down onto the gum tissue unlike the less flexible multi-headed toothbrushes of the prior art. In a preferred embodiment, the overmolding of the gumbrush arms with the elongated handle provides improved grip and reduces debris collection areas and thereby avoids bacterial growth and odor.

In another embodiment of the present invention, the gumbrush heads are overmolded onto the proximal end of the elongated handle after a toothbrush is formed on its distal end to provide a more comprehensive oral hygiene device. The toothbrush head is preferably integrally formed with the handle and the bristles are subsequently embedded therein. An overmolded distension can also be formed adjacent the toothbrush head to provide better grip when in use. Thus, a device for brushing the inner and outer gums and the sides of the teeth is disclosed herein which also provides the capability of brushing the chewing surfaces of the teeth as well as the palate and/or the tongue. Moreover, a tongue scraper is also preferably disposed on the toothbrush or distal end of the device of the present invention.

Accordingly, an object of the present invention is to provide a unique manufacturing process for a device which enables a user to attain comprehensive oral hygiene and includes a multi-headed and flexible oral care brush.

Another object is to provide a manufacturing process for a device for comprehensive oral hygiene which includes a multi-headed unobstructed gumbrush in combination with a toothbrush and/or a tongue scraper.

Still another object it to provide a manufacturing process for a multi-headed oral hygiene brush device involving overmolding brush components onto a handle.

Yet another object is to provide a device for oral hygiene which has a unique overmolded handle for securing brush components thereto and increasing manipulation, grip and control when in use.

And, still one further object it to provide for simpler manufacturing of a multi-headed brush using separately conventional brush-making techniques.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the drawings:

FIG. 2 is an exploded isometric view of an oral hygiene device shown prior to completion of a manufacturing process of the present invention;

FIG. 3 is an isometric view of an oral hygiene device shown prior to completion of a manufacturing process of the present invention with the brush heads disposed in operative position for final assembly;

FIG. 3A is a cross-sectional view taken on line 3A—3A of FIG. 3; and

FIG. 3B is a cross-sectional view taken on line 3B—3B of FIG. 3.

DESCRIPTION OF THE PREFERRED EMBODIMENT

The present invention is particularly directed to unique oral hygiene devices and the manufacture of such oral care devices which have a plurality of brush elements. Of primary concern is the manufacturing process of a device having at least two brush heads which are operatively disposed in generally opposing relationship to each other.

Figure 1:
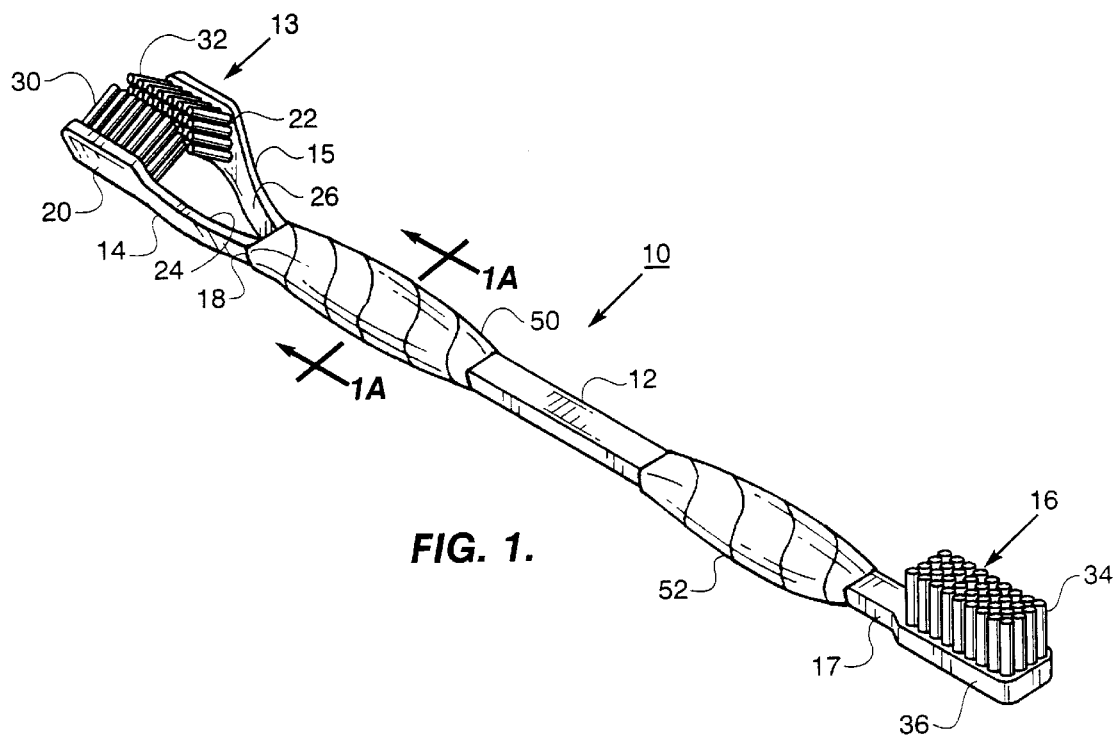
FIG. 1 is an isometric view of an oral hygiene device manufactured according to the present invention.

Referring now to the drawings, an exemplary oral hygiene device of the present invention is shown in FIGS. 1–3 and is identified by the general reference numeral 10. As shown more particularly in FIG. 1, device 10 includes several component parts. Primarily, these are an elongated handle 12 and a gumbrush 13 comprising two gumbrush components 14, 15. An optional toothbrush 16 may be disposed on the distal end 17 of handle 12 away from the proximal gumbrush end 18.

Gumbrush 13 comprises multiple features. Principal among these are heads 20 and 22 which are disposed in angled, generally opposed relationship to each other. Head 20 is integrally connected to a flexible arm 24 which in turn is connected to handle 12 in a manner that will be further described below. Likewise, head 22 is integrally connected to a flexible arm 26 which is also connected to handle 12 as will be described. Each head 20, 22 of gumbrush 13 has a respective set 30, 32 of bristles disposed therein and emanating therefrom. Bristles 30 extend generally perpendicularly out from head 20, and bristles 32 similarly extend generally perpendicularly out from head 22. Bristles 30 and 32 are generally clumped and embedded or implanted in heads 20, 22 as is generally known in the art and as will be described in the manufacturing process below. The lower bristles of each set 30, 32 are shorter than the upper bristles such that they generally define a meeting plane at which the outer ends of bristles 30 meet or nearly meet the ends of bristles 32.

In one embodiment of the present invention, gumbrush 13 is the sole brush disposed on a handle 12. However, as is also shown in FIGS. 1–3, the preferred embodiment of the present invention also has a toothbrush 16 disposed on handle 12. Toothbrush 16 is preferably disposed at the distal end of handle 12 opposite gumbrush 13. Toothbrush 16 also has bristles 34 which are preferably implanted in head 36 of toothbrush 16 prior to the overmolding process to be described. A projecting, ridged tongue scraper (not shown) may also be included on the underside of toothbrush head 36 to provide a complete ensemble comprehensive oral care device.

The manufacture of the present invention generally involves a unique combination of methods and procedures which separately are known by those skilled in the art of toothbrush manufacture. The major distinction resides in the use of overmolding to hold the independently molded gumbrush components 14, 15 onto handle 12. Also, the shapes and dispositions of the structural elements are uniquely applied within the conventional methods. Further, the choice of materials are generally as are known in the art. These include a sturdy polyolefin such as polypropylene for the handle 12 and gumbrush components 14, 15 to which a thermo plastic vulcanizate (TPV) such as SANTOPRENE is overmolded. Thus, the preferred embodiment of device 10 (including all brush heads, arms, etc.) will be molded as three separate pieces of sturdy, yet flexible polypropylene into which soft nylon bristles 30, 32 and 34 will be embedded prior to the overmolding of SANTOPRENE onto and about handle 12 and the arms of gumbrush components 14, 15.

In particular, the primary preferred method of manufacture is as follows. First, a handle 12 is molded from polypropylene according to known procedures. As noted, this handle can, but need not necessarily include a toothbrush 16 at its distal end. Handle 12 as shown in FIG. 2, also preferably is molded with indented shoulders 40 and 42 and reduced elongated edges 44, 46 for receiving gumbrush components 14, 15 as will be described.

The flexible plastic gumbrush components 14, 15 are also molded at or about this stage of the process. These may be molded completely separately from or independently of handle 12 or, as in Hegemann, molded simultaneously with handle 12 and potentially even integrally therewith by using runners molded as temporary connections therebetween. In any such case, components 14 and 15 will be sufficiently disposed away from handle 12 such that bristles 30, 32 can be simply embedded therein, trimmed and polished prior to the overmolding process for connecting components 14 and 15 to handle 12. If the runner-molded connection is used, as in Hegemann, the bristles 30, 32 can be embedded, cut and polished prior to or subsequent to separation of handle 12 from components 14, 15. One advantage to implantation prior to separation is that bristles 30, 32 and 34 could all be, as in Hegemann, implanted simultaneously in components 14, 15 and toothbrush 16. In either event, the second principle manufacturing step is the implantation, at least of bristles 30, 32 into brush components 14, 15.

The third principle manufacturing step is the positioning of handle 12 and components 14, 15, first in relative orientation as shown in FIG. 2, and then in operative relationship relative to each other as shown in FIG. 3 with the lower portions of components 14, 15 resting against the reduced portions 44, 46 and shoulders 40, 42 of handle 12. These parts are positioned this way in a secondary mold for the overmolding process referred to generally above. Then, in the fourth principle step, a preferably soft, rubber-like material is injected into the secondary mold to cover the lower elongated portions of brush components 14, 15 and the corresponding end portion of handle 12. This fourth step then results in a distended portion 50 as shown in FIG. 1 which covers the previously independent component parts and holds them in this integrated operative relationship.

If not done so already, and only if a toothbrush 16 is desired, bristles 34 could now be implanted in head 36. However, it is preferable to implant the toothbrush bristles 34 prior to the overmolding process and simultaneously or near in time to the implantation of bristles 30, 32 in heads 20, 22. Additionally, as shown in FIG. 1, it is preferred to overmold a section of handle 12 adjacent toothbrush 16 to create a distended portion 52. Distended portion 52 is useful to provide a better form for grip and manipulation by the user.

If SANTOPRENE or a similar substance is used for the overmolding material, the distensions 50, 52 will provide a preferably tough, strong connection with a soft, rubber-like grip. This soft-touch grip appears on both ends of the preferred embodiment shown in FIG. 1 for improved grip for use with the gumbrush as well as the toothbrush as these correspond with respective distended portions 50, 52. SANTOPRENE and such similar materials have been previously used on the handles of toothbrushes and other hand-held implements, such as shavers, for this soft-touch benefit; but, these materials have not been used for holding a plurality of previously separate components together in an integrated, fairly permanent connection. SANTOPRENE is preferred because it adheres well to polypropylene, the preferred material used for the basic component parts. This good adherence characteristic will provide for a tough, strong connection of components 14, 15 to handle 12 as well as providing a soft-touch grip.

Manufacturing according to the described process is beneficial for many reasons. Among these are the benefits derivable from being able to use conventional toothbrush manufacturing machinery along with conventional materials such as inexpensive polyproyplene and SANTOPRENE. Unreliable, labor intensive adhesives or other mechanical connections are not used. Debris accumulating pockets are also substantially eliminated. And, bristle implantation and trimming, inter alia, is simplified in that these can be performed in conventional manners prior to the final overmolding assembly of the gumbrush on the handle.

Figure 1A:
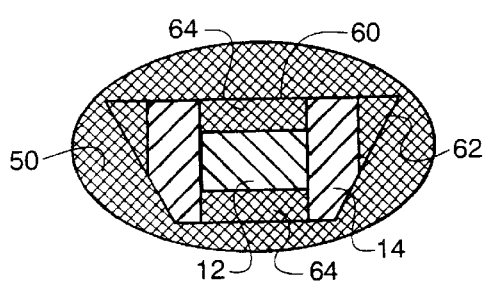
FIG. 1A is a cross-sectional view of the oral hygiene device of FIG. 1 taken on line 1A—1A.

Further, in the preferred embodiment, the reduced portion of handle 12 has numerous ridges 60 formed therein for receiving the overmolding material (such as SANTOPRENE). These ridges 60 are shown in FIGS. 2 and 3 and in hidden form by dashed lines in FIGS. 1A, 3A and 3B. An open ridge 60 is also shown in FIG. 3B. This will provide a stronger mechanical connection between the overmolding material 64 and handle 12. Brush components 14, 15 also preferably have one or more notches 62 formed therein for the same purpose. Open notches 62 are shown in FIGS. 2, 3 and 3B. Hidden-form, dashed line notches 62 are also shown in FIGS. 1A, 3A and 3B. After overmolding, ridges 60 and notches 62 are filled in with overmolding material 64 to increase resistance to longitudinal separation of handle 12 or components 14, 15 from overmolded distended portion 50. Offset top and bottom ridges 60 and lateral notches 62 are illustrated in FIG. 3B to establish still further strength enhancement in the coaction of overmolding material 64, handle 12 and components 14, 15. The offsets provide enhanced strength in limiting the reduced cross-sectional area of handle 12 and/or the combined cross-sectional area of handle 12 with components 14, 15 when operatively disposed relative thereto.

In use, gumbrush 13 may be employed to clean the lower sides of the teeth, the sulcular area between the teeth and gums as well as to clean and massage the gums. The present, preferred two-headed, angled and opposing arrangement of heads 20, 22 of gumbrush 13 provides for an extended reach down onto the gums of a typical user's teeth. A further unobstructed downward reach is provided by the elimination of a third head as taught by many prior devices. This provides a reach which is unhindered by the top, third head physically abutting against the teeth and obstructing or interfering with the downward reach of the opposing heads. Thus, heads 20, 22 will easily reach as far down onto the gums as needed to thoroughly clean and massage the entire gums. The flexible, yet shape-retaining arms 24, 26 provide for a continuous amount of pressure of bristles 30, 32 on the teeth and gums regardless the thickness of the teeth and/or gums being cleaned or massaged. Moreover, the SANTOPRENE overmolding may allow for still further outward flexure of arms 24, 26 than would be achievable by the flexure of arms 24, 26 alone.

Device 10 may then also be flipped end for end so that toothbrush 16 can be used. Toothbrush 16 particularly provides for the cleaning of the tops and sides of the crowns of a user's teeth in the usual way. If angularly extending or variously sized bristles (not shown) are used in brush 16 as are known in the art, then head 36 may be easily manipulated to also provide brushing access to the indentations on the chewing surfaces of the teeth or to allow simultaneous brushing of the chewing surfaces as well as the corners and upper sides of the teeth. Toothbrush 16 is also useful for brushing the tongue and palate. Plaque on the tongue and palate is at least loosened and may be removed by back and forth strokes of bristles 34. A wider head 36 as taught in other forms in the art, would provide a wide area of contact that would also be beneficial here.

Brush head 36 may then be flipped over and an optional tongue scraper (not shown) can be pulled across the tongue and/or palate to scrape away the plaque. A preferred projecting ridge scraper disposed on the underside of brush head 36 is particularly useful for scraping along the length of the tongue when pulled along the tongue from inside, deep in the mouth out to the tip of the tongue.

Alternative shapes for many of the above described elements may also be used within the present invention. Less conventional circular or oblique heads such as are known in the art may be substituted for head 36 of brush 16 of the preferred embodiment. In like manner, myriad other structural substitutions may also be used within the spirit of this invention. For example and still within the present invention, a third brush could easily be included such as that shown in the prior Hegemann toothbrush referred to above wherein the third brush could be useful for cleaning the top surfaces of the teeth simultaneously with the use of the gumbrush to clean and/or massage the side surfaces of the teeth and gums. Such a third brush may be integrally formed with handle 12, or be independent like components 14, 15 and subsequently secured to handle 12 during the overmolding process. Thus, the overmolding material 64 would secure this third brush on handle 12 in the same manner. Likewise, any other practical number of brushes could be overmolded onto handle 12. This includes overmolding singular brushes and/or toothbrush 16, et alius.

From the foregoing, it is readily apparent that a new and useful embodiment of the present invention has been herein described and illustrated which fulfills all of the aforestated objectives in a remarkably unexpected fashion. It is, of course, understood that such modifications alterations and adaptations as may readily occur to the artisan confronted with this disclosure are intended within the spirit of this disclosure which is limited only by the scope of the claims appended hereto.

Accordingly, what is claimed is:

1. An oral hygiene device comprising a handle having a multi-headed brush attached to one end of said handle, said multi-headed brush comprising a plurality of independent brush components, each of which are attached to said handle by an overmolding material which secures said brush components to said handle, each of said brush components having bristles embedded therein prior to being attached to said handle by said overmolding material.

2. An oral hygiene device according to claim 1 in which said handle and said plurality of independent brush components are independently molded.

3. An oral hygiene device according to claim 1 in which said handle and said plurality of independent brush components are initially integrally molded.

4. An oral hygiene device according to claim 1 in which said handle has a reduced edge.

5. An oral hygiene device according to claim 1 in which said handle has a shoulder.

6. An oral hygiene device according to claim 1 in which said handle has a ridge formed thereon.

7. An oral hygiene device according to claim 1 in which each of said plurality of brush components has a notch formed thereon.

8. An oral hygiene device according to claim 1 in which said handle includes a toothbrush on one end thereof.

* * * * *